United States Patent
Hechtle et al.

(10) Patent No.: US 7,290,963 B2
(45) Date of Patent: Nov. 6, 2007

(54) DRILL GUIDE FOR CUTTING OPENINGS IN STONE COUNTERTOPS

(75) Inventors: Jeff Hechtle, Higley, AZ (US); Thomas Patrick Rouse, San Jose', CA (US)

(73) Assignee: J & K Capital LLC, Higley, AZ (US)

( * ) Notice: Subject to any disclaimer, the term of this patent is extended or adjusted under 35 U.S.C. 154(b) by 0 days.

(21) Appl. No.: 11/118,061

(22) Filed: Apr. 29, 2005

(65) Prior Publication Data

US 2006/0245835 A1     Nov. 2, 2006

(51) Int. Cl.
   *B23B 49/02*     (2006.01)
(52) U.S. Cl. .................... 408/76; 408/115 R
(58) Field of Classification Search ............ 408/72 B, 408/115 R, 115 B, 241 B, 76, 56; 125/20; 175/209, 210, 220; *B23B 47/28, 49/02*
   See application file for complete search history.

(56) References Cited

U.S. PATENT DOCUMENTS

| | | | | |
|---|---|---|---|---|
| 1,994,516 | A | * | 3/1935 | Hawn ........................ 408/56 |
| 2,140,901 | A | | 12/1938 | Etzenhouser |
| 2,151,205 | A | | 3/1939 | Hawn |
| 2,184,919 | A | | 12/1939 | Miller |
| 2,417,539 | A | * | 3/1947 | Aronson ................... 408/72 R |
| 2,661,641 | A | * | 12/1953 | Wood, Jr. .................... 408/76 |
| 2,680,435 | A | | 6/1954 | Gonzalez |
| 2,915,926 | A | * | 12/1959 | Woerner ................ 408/241 R |
| 2,946,246 | A | * | 7/1960 | Allan .......................... 408/76 |
| 3,015,242 | A | * | 1/1962 | Armacost ............... 408/241 R |
| 3,097,891 | A | * | 7/1963 | Brideau ........................ 384/31 |
| 3,115,911 | A | | 12/1963 | Van Auken |
| 3,162,066 | A | * | 12/1964 | Morey et al. ................. 408/76 |
| 3,351,143 | A | * | 11/1967 | Seibold et al. .............. 175/209 |
| 3,610,349 | A | | 10/1971 | Dempsey |
| 4,029,160 | A | | 6/1977 | Leidvik |
| 4,468,159 | A | | 8/1984 | Oster |
| 6,193,449 | B1 | | 2/2001 | Diaz |
| 6,857,830 | B2 | | 2/2005 | Holcomb |

FOREIGN PATENT DOCUMENTS

| | | | |
|---|---|---|---|
| CH | 683677 A5 | * | 4/1994 |
| DE | 702918 | * | 1/1941 |
| DE | 2054128 A | * | 5/1972 |
| DE | 268642 A1 | * | 6/1989 |
| JP | 57048410 A | * | 3/1982 |

* cited by examiner

*Primary Examiner*—Daniel W. Howell
(74) *Attorney, Agent, or Firm*—Todd N. Hathaway

(57) ABSTRACT

A guide assembly for use with a rotating bit when forming an opening in a stone countertop. The assembly includes a base unit having an annular, resiliently flexible body with a ring-shaped suction cup at its lower end. The suction cup forms a seal about the bottom of the base unit that forms a reservoir for holding water during the cutting operation. A rigid ring-shaped insert is mounted in the resilient body and includes a plurality of upwardly projecting mounting pegs. Flat, disk-shaped guide bushings are interchangeably mountable to the pegs atop the base unit, and have central guide openings of different sizes for different sizes of bits. The guide bushings are formed of a rigid, low-friction material, such as a low-friction polymeric material.

14 Claims, 4 Drawing Sheets

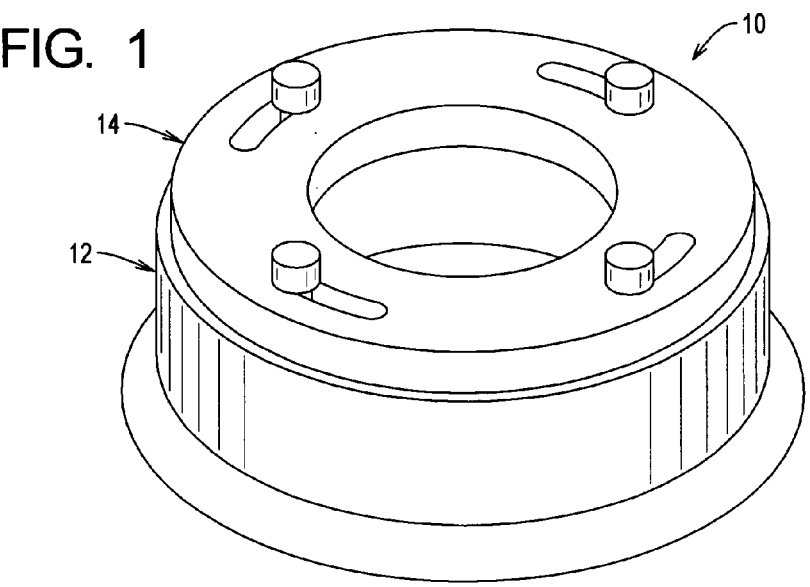
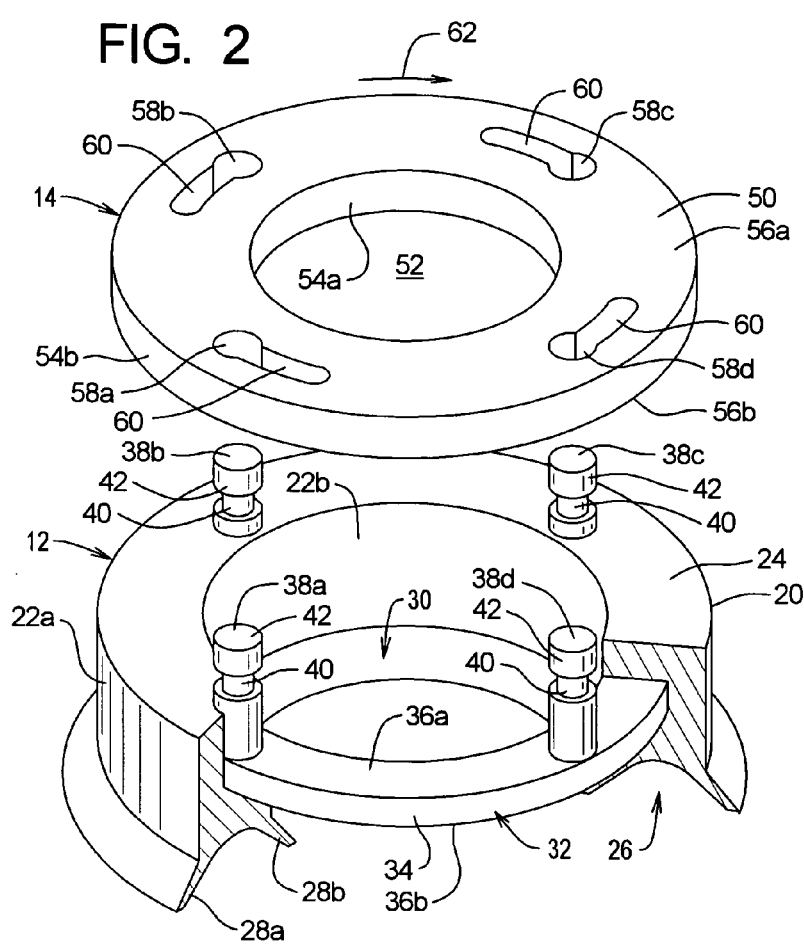

DRILL GUIDE FOR CUTTING OPENINGS IN STONE COUNTERTOPS

BACKGROUND OF THE INVENTION a. Field of the Invention

The present invention relates generally to apparatus for a portable cutting and boring holes in countertops formed of stone and similar materials, and, more particularly, a guide assembly for directing a cylindrical, rotary bit when cutting a hole in a countertop that is formed of such a material.

b. Related Art

Stone countertops are an increasingly popular feature of both residential and commercial construction, valued for both their durability and beauty. As used in this description and the appended claims, the term "stone" includes natural stone (e.g., granite, marble, and so on) and artificial stone materials. The term "countertop", in turn, includes not only kitchen and bathroom counters, but also worktops, tub surrounds and similar installations.

A major difficulty facing installers is cutting/boring holes to accommodate various items that must pass through the countertop, such as faucets and other plumbing fixtures, wiring, and so on. This must be done after the countertop itself has been placed into position and installed. As a result, the holes must frequently be formed in corners, along edges, and in other areas where access is limited or difficult. The operation is further complicated by the fact that the surface must be kept flooded with water or other lubricant for the bit during the cutting operation. However, even a minor error in the location or angle of the hole can ruin the countertop so that it must be removed and replaced, at great expense to the installer; such errors are far from infrequent, and cost even experienced installers many thousands of dollars every year.

Prior devices have been proposed to provide guidance for a bit or other cutting tool when forming holes in stone or similar materials. The great majority of these devices are simply too large and cumbersome for use in countertop installation work, especially where the holes need to be formed in tight areas or close to an obstacle; many have been designed as shop tools that would be wholly unsuitable to the needs of a craftsman drilling a hole at the point of installation. In other instances, the devices, although smaller, have been insufficiently secure to avoid slippage and error. Most prior devices have also been complicated and expensive, and moreover have been difficult and inconvenient to use. Also, many of the prior devices employ or require the use of obsolete forms of drill motors that are no longer used in the industry; for example, pistol-grip drills are no longer used for coring bits, which now utilize industry-standardized acme threads. As yet another drawback the prior devices have generally been constructed with metal bodies or housings, thus making it virtually inevitable that the countertop or adjoining surfaces will be scratched or otherwise marred during use of the tool.

Accordingly, there exists a need for an apparatus for guiding a rotating bit while forming a hole in a stone countertop, that securely attaches to the countertop so as to obviate any potential for slippage and error. Furthermore, there exists a need for such an apparatus that can be conveniently used in areas where access or space is limited. Still further, there exists a need for such an apparatus that provides a reservoir in order to keep the material and bit flooded with fluid during the cutting operation. Still further, there exists a need for such an apparatus that can be used with conventional hole-cutting bits and tools that does not require the installer to purchase special drill motors/equipment. Still further, there exists a need for such an apparatus that is simple and convenient for the operator to use. Still further, there exists a need for such an apparatus that can readily accommodate the different sizes of bits that are used in forming holes in countertops. Still further, there exists a need for such an apparatus that obviates the possibility of scratching, marring or otherwise damaging the countertop and adjoining surfaces. Still further, there exists a need for such an apparatus that can be manufactured on an economical basis.

SUMMARY OF THE INVENTION

The present invention has solved the problems cited above, and is a guide assembly for use with a rotating bit when forming an opening in a stone countertop. Broadly, the guide assembly comprises: (a) a generally annular base unit having a vertically extending interior opening and a resiliently flexible body, (b) means for detachably mounting the base unit to the surface of a stone countertop so that the interior opening of the base unit forms a reservoir for retaining a volume of fluid atop the surface, and (c) at least one bushing member that is mountable atop the base unit and has an opening for receiving and guiding the cutting bit downwardly through the interior opening of the base unit so as to be directed against the underlying countertop.

The at least one bushing member may comprise a plurality of bushing members having guide openings of differing diameters for use with different sizes of bits, and means for interchangeably mounting the plurality of bushing members to the base unit.

The means for detachably mounting the base unit to the surface of a stone countertop may comprise at least one suction cup. The at least one suction cup may comprise an annular suction ring that is formed around a lower end of the resiliently flexible body of the base unit, for forming a fluid-tight seal around the bottom of the interior opening when in engagement with the countertop surface.

The base unit may further comprise a substantially rigid load-bearing member that is mounted to the resiliently flexible body so as to receive loads from the bushing member that is mounted thereto. The load-bearing member may comprise a rigid ring that is mounted to the resiliently flexible body around the interior opening of the base unit, and means for mounting the bushing member to the ring. The rigid ring may be embedded in the resiliently flexible body of the base unit, and the means for mounting the bushing member thereto may comprise at least one projection that extends upwardly from the ring for attachment of the bushing member thereto. The at least one upwardly extending projection may comprise a plurality of mounting pegs extending upwardly from the rigid ring at spaced locations about a perimeter of the base unit, for being received in locking engagement with cooperating openings about a perimeter of the bushing member.

The bushing members may be formed of a substantially rigid, low friction material, such as nylon, UHMWPE or DELRIN™, for example.

These and other features and advantages of the present invention will be more fully understood from a reading of the following detailed description with reference to the accompanying drawings.

BRIEF DESCRIPTION OF THE DRAWINGS

FIG. 1 is a perspective view of a guide assembly in accordance with the present invention;

FIG. 2 is an exploded, partially cut-away view of the guide assembly of FIG. 1, showing the rigid internal ring structure that supports the mounting pegs and the relationship of the guide bushing thereto in greater detail;

DETAILED DESCRIPTION a. Overview

Figure 3:
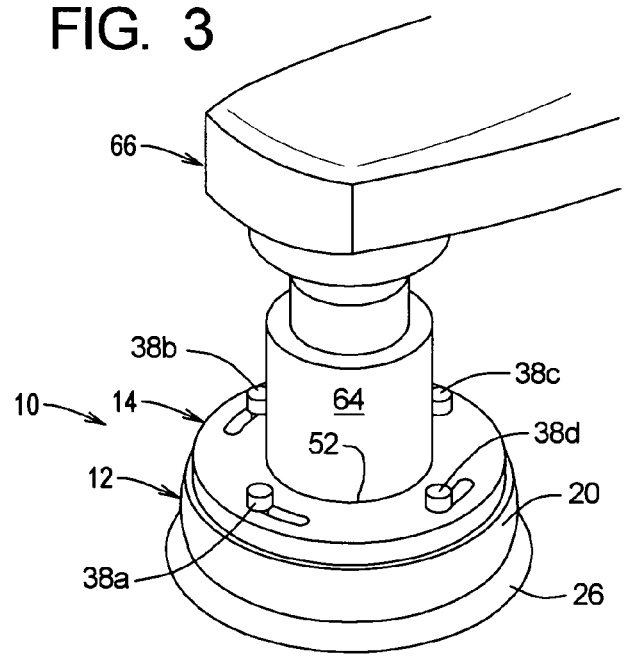
FIG. 3 is a perspective, environmental view of the guide assembly of FIGS. 1–2, showing the manner in which this is used in conjunction with a hole saw bit driven by an exemplary angle grinder motor.

FIG. 1 shows a guide assembly 10 in accordance with the present invention. As can be seen, the assembly includes a base unit 12 that attaches to the countertop surface and a bushing member 12. As will be described in greater detail below, the bushing member is one of a plurality of such members that interchangeably mount to the upper end of the base unit.

As can be seen in greater detail in FIG. 2, the base unit 12 includes an annular, vertically extending body 20 having generally cylindrical outer and inner walls 22a–22b that define a vertically extending interior opening. The upper surface 24 of the body forms a generally flat, ring-shaped surface, while the lower end of the body forms an annular suction cup or ring 26 having outwardly and inwardly angled flange portions 28a, 28b.

The body 20 of the base unit is formed of a resiliently flexible material, such as molded polyurethane or rubber, for example. Consequently, when pressed downwardly against the smooth upper surface of the stone countertop, the flanges 28a, 28b spread outwardly and air is forced out of the suction ring 26, so that when the downward force is released the suction ring acts to hold the assembly firmly in place on the countertop. Moreover, the inside flange 28b and wall 24 of the base unit define a fluid-tight reservoir 30 for holding a supply of water or other lubricant/cutting fluid during the cutting operation.

The base unit further includes a rigid ring-shaped insert 32 that is molded into or otherwise embedded within the resiliently flexible material that forms the body 20. The main ring 34 of the insert extends circumferentially about the central opening of the body, and is set a spaced distance below its upper surface 24. As can be seen, the ring 34 includes broad upper and lower surfaces 36a, 36b, for effectively transferring vertical loads into the resilient material of the body.

A plurality of attachment pegs 38a–d project above the upper wall 24 of the resilient body. Each of the mounting pegs is a vertically elongate, cylindrical member having a circumferential channel 40 formed proximate its upper end, below the head 42 of the peg. The ring insert, including the mounting pegs, is suitably formed of metal (e.g., steel) or other rigid material, such as rigid plastic or composite material.

The bushing member 14, in turn, includes a comparatively thin, annular plate 50 having a circular central opening 52 and inner and outer walls 54a, 54b. The substantially flat upper and lower surfaces 56a, 56b, in turn, extend parallel to and generally match the flat upper surface 24 of the base unit 12.

A plurality of vertical bores 58a–d are formed through the plate of the guide bushing, intermediate the inner and outer walls 54a, 54b, and are sized and positioned to permit passage of the heads 42 of the mounting pegs therethrough. Slots 60 extend in a counter-clockwise direction from each of the bores 58a–d and are somewhat narrower in diameter, being sized to receive the undercut channels 40 beneath the heads of the mounting pegs. Bushing member 14 is thus installed on the base unit by placing the bushing member over the mounting pegs and then rotating it in a clockwise direction, as indicated by arrow 62 in FIG. 2.

As will be described in greater detail below, the main opening 52 of the guide bushing is sized to correspond to a predetermined size of bit, so that the inner wall 54a engages the exterior of the bit and guides it during operation. The guide bushing is preferably formed of a rigid or substantially rigid material exhibiting a low co-efficient of friction, such as nylon, UHMWPE, DELRIN™, and other plastic materials. The bushings that are shown in the drawings are particularly configured for use with diamond coring bits that are generally standardized within the industry, however, it will be understood that the bushings may be configured/sized for use with other types of bits as well.

b. Operation

Use of the guide assembly 10 is illustrated in FIG. 3.

The installer first determines the size of bit 64 that is required to form the opening, and then selects that bushing plate 14 which has the correspondingly-sized opening 52. The bushing plate is placed over the mounting pegs and rotated as described above, so as to mount the plate to the base unit 12.

The operator then positions the guide assembly at the location of the hole that is to be formed. For example, the hole may be marked on the surface, e.g., using a template. The lower end of the bit may then be placed precisely at the marked location, and held in place while the guide assembly is slipped over the top of the bit then down over the exterior of the bit to the countertop surface. The operator then presses downwardly on the guide assembly so that the annular suction ring 26 firmly attaches to the surface and forms a fluid-tight seal, in the manner described above.

Once the guide assembly has been attached to the surface, the operator pulls the bit 64 upwardly back out of the opening 52, and fills the reservoir 30, with water or other fluid. The bit is mounted to a suitable drive motor, for example, an angle grinder motor 66 as shown in FIG. 3.

With the motor attached, the bit is reinserted into the guide opening 52 and cutting is commenced. As this is done, the inner wall 54a of the guide bushing (see FIG. 2) cooperates with the cylindrical exterior of the bit to provide a firm guiding action that keeps the bit securely positioned at the intended location. At the same time, the water or other fluid in the reservoir keeps both the bit and the stone material flooded during the cutting action.

Operation of the drill motor and bit inevitably produces vibration and a degree of "wobbling" motion, due to imbalances and misalignments that are generally inherent in such equipment. The resiliently flexible body 20 of the guide assembly absorbs and accommodates these motions while always providing a restoring force that returns the bit to its proper alignment; by contrast, a rigid body would tend to amplify and worsen such motions. Moreover, the vibrations and motions are absorbed by the flexible body without distorting the annular suction ring excessively or causing it to lose its grip on the countertop surface. The resilient, comparatively soft material also obviates any possibility of scratching or otherwise marring the countertop or adjoining surfaces during positioning and/or operation of the assembly.

After the hole has been formed, the operator withdraws the bit upwardly out of the guide assembly and then releases the suction ring from the surface, e.g., by sliding a putty knife or other thin blade under the lip of the outer flange 28a.

It will be understood that the exact steps and sequence of operation in use of the guide assembly may vary somewhat from the example set forth above.

c. Construction and Components

The construction and relation of the components of the assembly are described in greater detail below, with reference to FIGS. 4–7b.

Figure 4:
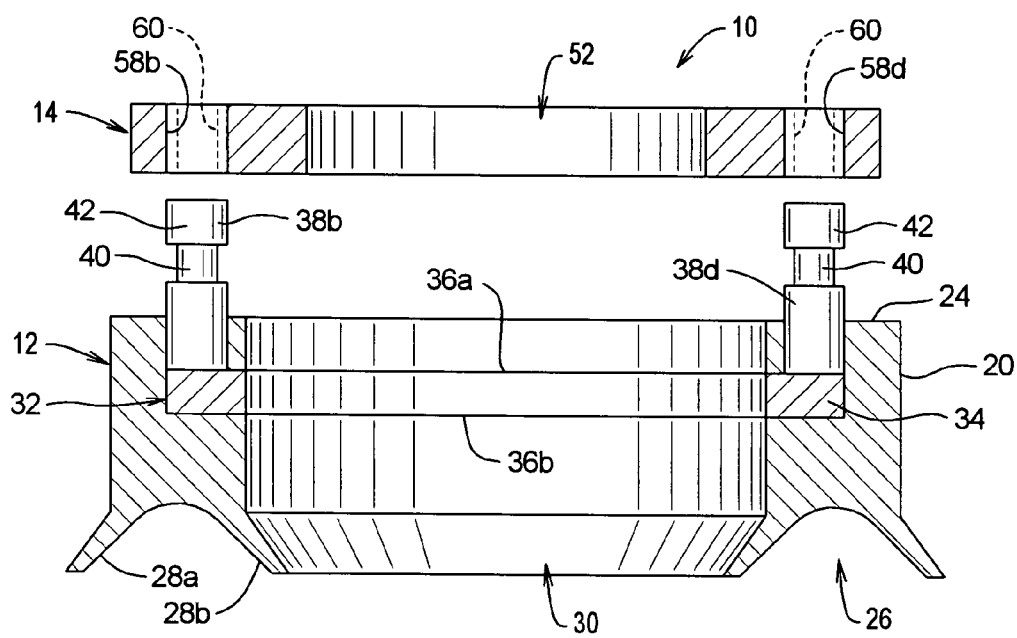
FIG. 4 is a cross-sectional view of the guide assembly of FIGS. 1–2, showing the structure thereof in greater detail.

Accordingly, FIG. 4 shows the manner in which the bores 58a–d align vertically with the mounting pegs 38a–d when the bushing plates are positioned over the base unit 12. As can also be seen, the undercut channels 40 formed in the mounting pegs are located a spaced distance above the upper surface 24 of the resilient body 20 of the base unit. Consequently, when the guide bushing is placed over the pegs and rotated so that the annular channels 40 are received in slots 60, the plate is positioned slightly above the upper surface 24 of the resiliently flexible body. This arrangement ensures that the resilient restoring force exerted on the guide bushing is provided by the interface of the entire ring member with the flexible body, and not just an area of contact between the body and the bottom of the bushing plate. However, it will be understood that in some embodiments, the bushing plate may mount directly against, or be seated within, the top of the flexible body of the base unit.

Figure 5A:
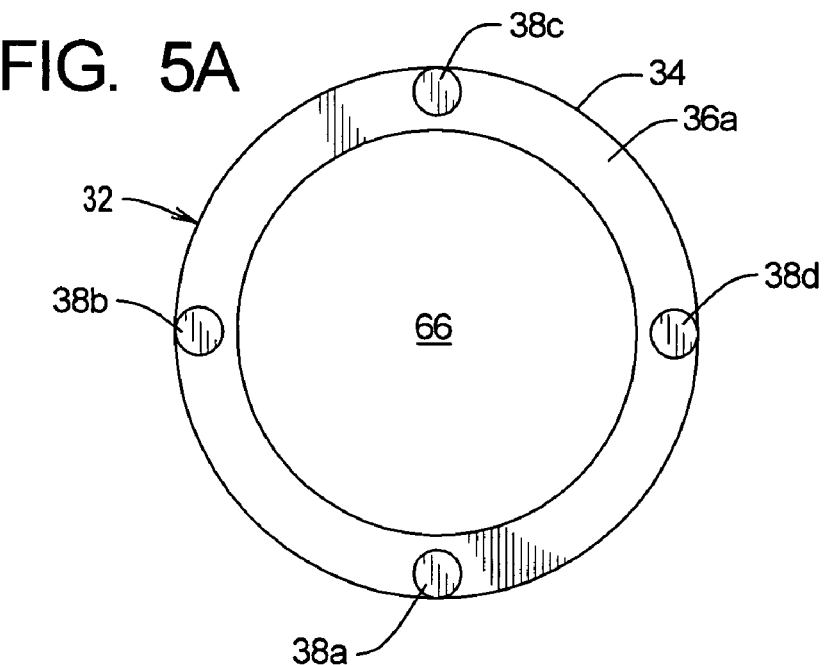
FIGS. 5A and 5B are, respectively, plan and elevational views of the rigid, internal ring of the guide assembly of FIGS. 1–2, and the upwardly-projecting attachment of the interchangeable guide bushings.
Figure 5B:
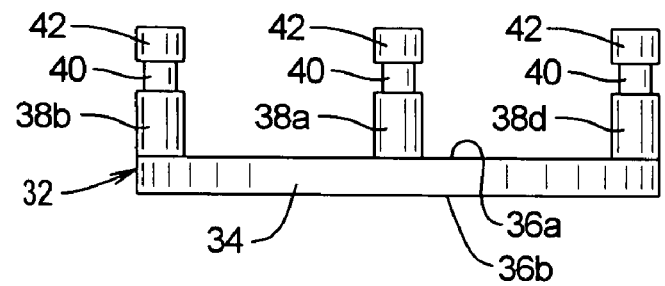
Figure 6A:
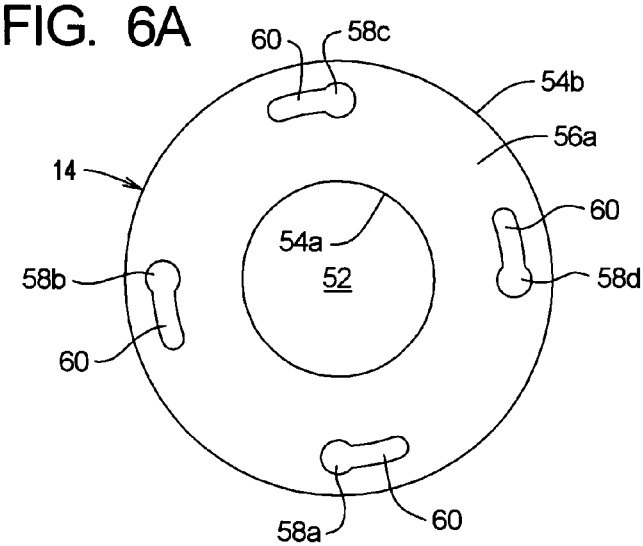
FIGS. 6A and 6B are, respectively, plan and elevational views of a first guide bushing of the guide assembly of FIGS. 1–2, showing the structure thereof in greater detail.
Figure 6B:
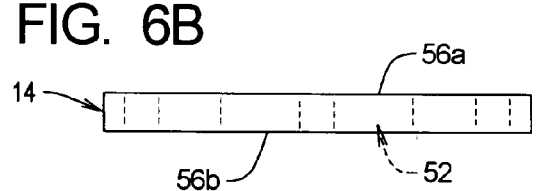
Figure 7A:
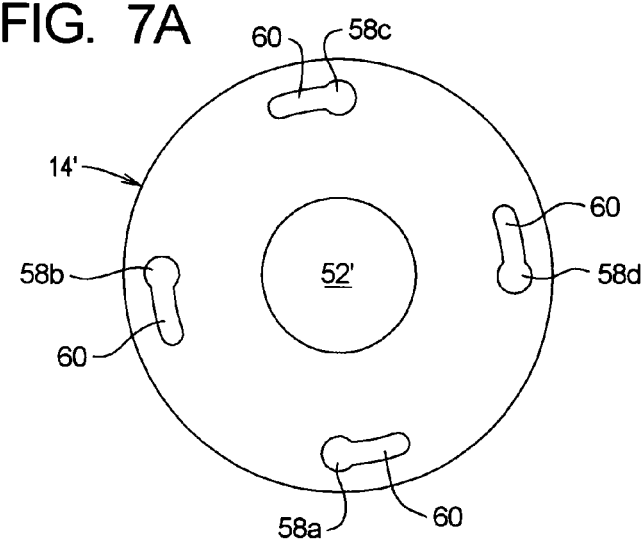
FIGS. 7A and 7B are, respectively, plan and elevational views of a second interchangeable guide bushing for the guide assembly of FIGS. 1–2, showing the manner in which the interchangeable guide bushings are provided with guide openings having different diameters to accommodate different sizes of bits.
Figure 7B:
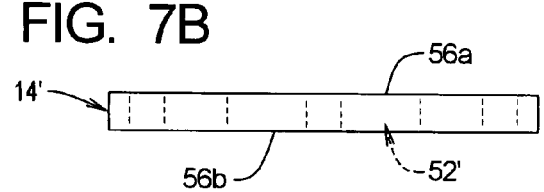

FIGS. 5A–5B show the ring-shaped insert 32 in greater detail, separated from the flexible body of the base unit. The insert is preferably formed as a single, unitary structure, including the main ring 34 and upwardly projecting mounting pegs 38a–d. Suitable materials include, as noted above, metals such as steel, and other rigid materials such as rigid polymeric and composite materials, for example.

As can be seen with further reference to FIGS. 5A–5B, the mounting posts 38a–d are preferably spaced equidistantly about the perimeter of the main ring 34. Four mounting pegs are included in the embodiment that is illustrated, however, it will be understood that in other embodiments, the number of pegs may be greater or fewer. Moreover, it will be understood that other forms of attachments may be used in addition to or in place of the "bayonet-style" mount that is shown, provided that they allow interchangeable installation of different sizes of bushing plates.

The main ring 34 of the insert is relatively flat in the horizontal dimension, with broad, generally planar upper and lower surfaces 36a, 36b that serve to effectively transfer and distribute vertical forces and loads into the resilient material of the flexible body 20, thus maximizing restoring forces and avoiding damage to the resilient material. The central opening 66 of the ring, in turn, is sized to generally match that of the interior of the resilient body, i.e., the interior that forms the reservoir 30.

By way of example, without limitation, exemplary dimensions suitable for the ring-shaped insert 32 of the preferred embodiment that is illustrated in FIGS. 1–2 are set forth in the following Table A:

TABLE A

| | |
|---|---|
| Inside diameter of ring | 2.00" |
| Outside diameter of ring | 2.60" |
| Peg-Peg diameter | 2.37" |
| Ring thickness (vertical) | 0.180" |
| Peg height (total from bottom of ring) | 0.120" |
| Height to bottom of undercut groove | 0.500" |
| Width of undercut groove | 0.150" |

Again, it will be understood that the foregoing dimensions are provided by way of example, and may differ significantly depending on the size ranges of the guide assembly, the characteristics of the materials, and other design factors.

FIGS. 6A–6B and 7A–7B show first and second bushing plates that are interchangeably mountable on the base unit described above, these being identical except for the size of the guide opening that is provided for the bit.

The bushings have the overall configuration of a comparatively thin, circular plates. As noted above, the plates are preferably formed of a rigid material that exhibits both a low surface co-efficience of friction and good wear characteristics when bearing against the exterior of the rotating bit, which is typically made of tool steel. Examples of suitable materials include nylon, UHMWPE and DELRIN™, all of which are available in sheet form, from which the bushing plates can be constructed by cutting/machining or other conventional techniques. The bushing plates may also be cast from suitable materials. Moreover, while it is generally preferable from the standpoint of economy for the bushing plates to be formed of a single piece of material, in some embodiments, a composite or multi-piece structure may be utilized, e.g., a metal plate with a low friction insert that forms the inside surface of the bushing.

As noted above, the bushing plates shown in FIGS. 6A–6B and 7A–7B are identical except for the size of the guide opening: in this example, the bushing plate 14 that is shown in FIGS. 6A–6B has a comparatively large (1.540 inch) opening 52 for use with a 1½ inch bit, while the second bushing plate 14' has a smaller (1.040 inch) opening 52' for use with a 1 inch bit. It has generally been found suitable to size the diameter of the opening approximately 0.040" greater than diameter of the bit with which the bushing is to be used. The bushing plates are interchangeably mountable to the base unit 12, so that a single base unit can be used with multiple bushing plates having guide openings over a wide range of sizes.

Exemplary dimensions for bushing plates suitable for use in the embodiment shown in FIGS. 1–2 are set forth in the following Table B:

TABLE B

| | |
|---|---|
| Thickness | 0.25" |
| Outside diameter | 2.875" |
| Inside diameter | var. |
| Peg hole diameter | 0.250" |
| Slot width | 0.170" |
| Slot length | 24° of circ. |

Again, it will be understood that the foregoing dimensions are only illustrative of a preferred embodiment, and may vary in other embodiments and depending on design factors.

It is to be recognized that various alterations, modifications, and/or additions may be introduced into the constructions and arrangements of parts described above without departing from the spirit or ambit of the present invention as defined by the appended claims.

What is claimed is:

1. A guide assembly for use with a rotating bit when forming an opening in a stone countertop, said guide assembly comprising:

a generally annular base unit having a vertically extending interior opening and a resiliently flexible body;

means for detachably mounting said base unit to a surface of a stone countertop so that said interior opening of said base unit forms a reservoir for retaining a volume of fluid therein;

at least one bushing member that is mountable atop said base unit and that has an opening for receiving and guiding said rotating bit downwardly through said interior opening of said base unit and against said surface of said countertop, said at least one bushing member comprising:

a plurality of bushing members having guide openings of differing diameters for use with different sizes of bits; and means for detachably mounting said plurality of bushing members interchangeably to said base unit, said means for detachably mounting said bushing members to said base unity comprising:

a substantially rigid load-bearing ring that is embedded in said resiliently flexible body about said interior opening of said base unit so as to receive loads from said bushing members that are mountable thereto; and a plurality of mounting pegs that extend upwardly from said rigid ring above said resiliently flexible body at spaced locations about a perimeter of said base unit, for being received in locking engagement with cooperating openings about perimeters of said bushing members.

2. The guide assembly of claim 1, wherein said means for detachably mounting said base unit to a surface of the stone countertop comprises:

at least one suction cup.

3. The guide assembly of claim 2, wherein said at least one suction cup comprises:

an annular suction ring that is formed about a lower end of said resiliently flexible body of said base unit, for forming a fluid-tight seal around a bottom of said interior opening of said base unit when in engagement with a surface of a countertop.

4. The guide assembly of claim 3, wherein said annular suction ring comprises:

first and second depending flange portions of said resiliently flexible body that extend outwardly and inwardly to form a ring-shaped suction cup about said bottom end of said flexible body.

5. A guide assembly for use with a rotating bit when forming an opening in a stone countertop, said guide assembly comprising:

(a) a base unit, comprising:

a generally annular body formed of a resiliently flexible material, said body having upper and lower ends and a generally vertically extending interior opening;

an annular suction ring formed about said lower end of said resiliently flexible body by downwardly-angled inner and outer flange portions thereof, for sealingly mounting said base unit to a surface of a stone countertop so that said interior opening forms a reservoir for retaining a volume of fluid; and a rigid load-bearing ring member mounted to said resiliently flexible body;

(b) a plurality of bushing members, each said bushing member comprising:

a comparatively thin, rigid plate member; and a guide opening formed generally centrally in said plate member; and (c) means for interchangeably mounting said plurality of bushing members to said rigid load-bearing ring so that said guide members are positioned atop said base unit for receiving and guiding said bits downwardly through said interior opening and against said surface of said countertop.

6. The guide assembly of claim 5, wherein said means for interchangeably mounting said plurality of guide bushings to said rigid load-bearing ring comprises:

a plurality of mounting posts that extend upwardly from said rigid ring at spaced locations about a perimeter of said base unit; and a plurality of openings formed in said rigid plate members for receiving said mounting posts therein.

7. The guide assembly of claim 6, wherein said rigid ring is embedded within said resiliently flexible body of said base unit and said mounting posts project upwardly above an upper surface of said body.

8. The guide assembly of claim 5, wherein said bushing members are each formed unitarily of a low-friction, wear-resistant polymeric material.

9. A guide assembly for use with a rotating bit when forming an opening in a stone countertop, said guide assembly comprising:

a generally annular base unit having a vertically extending interior opening and a resiliently flexible body;

means for detachably mounting said base unit to a surface of a stone countertop so that said interior opening of said base unit forms a reservoir for retaining a volume of fluid therein;

at least one bushing member that is mountable atop said base unit and that has an opening for receiving and guiding said rotating bit downwardly through said interior opening of said base unit and against said surface of said countertop, said at least one bushing member comprising:

a plurality of bushing members having guide openings of differing diameters for use with different sizes of bits; and means for detachably mounting said plurality of bushing members interchangeably to said base unit, said means for detachably mounting said bushing members to said base unity comprising:

a substantially rigid load-bearing ring that is embedded in said resiliently flexible body about said interior opening of said base unit so as to receive loads from said bushing members that are mountable thereto;

at least one projection that extends upwardly from said rigid ring above said resiliently flexible body for attachment of said bushing members thereto; and means for mounting said bushing members to said at least one projection at a spaced distance above said resiliently flexible body, so that loads imparted to a bushing member are transferred through said at least one projection to said rigid ring that is embedded in said resiliently flexible body.

10. A guide assembly for use with a rotating bit when forming an opening in a stone countertop, said guide assembly comprising:
- a generally annular base unit having a vertically extending interior opening and a resiliently flexible body;
- means for detachably mounting said base unit to a surface of a stone countertop so that said interior opening of said base unit forms a reservoir for retaining a volume of fluid therein;
- at least one bushing member that is mountable atop said base unit and that has an opening for receiving and guiding said rotating bit downwardly through said interior opening of said base unit and against said surface of said countertop, said at least one bushing member comprising:
  - a plurality of bushing members comprising comparatively thin, rigid plate members having circular guide openings formed centrally therein, said bushing members having guide openings of differing diameters for use with different sizes of bits; and
- means for detachably mounting said plurality of bushing members interchangeably to said base unit, said means for detachably mounting said bushing members to said base unity comprising:
  - a substantially rigid load-bearing ring that is embedded in said resiliently flexible body about said interior opening of said base unit so as to receive loads from said bushing members that are mountable thereto; and
  - at least one projection that extends upwardly from said rigid ring above said resiliently flexible body for attachment of said bushing members thereto.

11. The guide assembly of claim 10, wherein said bushing members are formed of a substantially rigid, low friction material.

12. The guide assembly of claim 11, wherein said rigid, low friction material comprises a wear-resistance polymeric material.

13. A guide assembly for use with a rotating bit when forming an opening in a stone countertop, said guide assembly comprising:
- a generally annular base unit having a vertically extending interior opening and a resiliently flexible body;
- means for detachably mounting said base unit to a surface of a stone countertop so that said interior opening of said base unit forms a reservoir for retaining a volume of fluid therein;
- at least one bushing member that is mountable atop said base unit and that has an opening for receiving and guiding said rotating bit downwardly through said interior opening of said base unit and against said surface of said countertop, said at least one bushing member comprising:
  - a plurality of bushing members having guide openings of differing diameters for use with different sizes of bits; and
- means for detachably mounting said plurality of bushing members interchangeably to said base unit, said means for detachably mounting said bushing members to said base unity comprising:
  - a substantially rigid load-bearing ring that is embedded in said resiliently flexible body at a position intermediate upper and lower ends thereof and about said interior opening of said base unit so as to receive loads from said bushing members that are mountable thereto; and
  - at least one projection that extends upwardly from said rigid ring above said resiliently flexible body for attachment of said busing members thereto.

14. The guide assembly of claim 13, wherein said rigid ring comprises:
- broad, generally flat upper and lower surfaces for distributing and transferring loads from said rigid ring into said resiliently flexible body of said base unit.

\* \* \* \* \*